Figure 1:
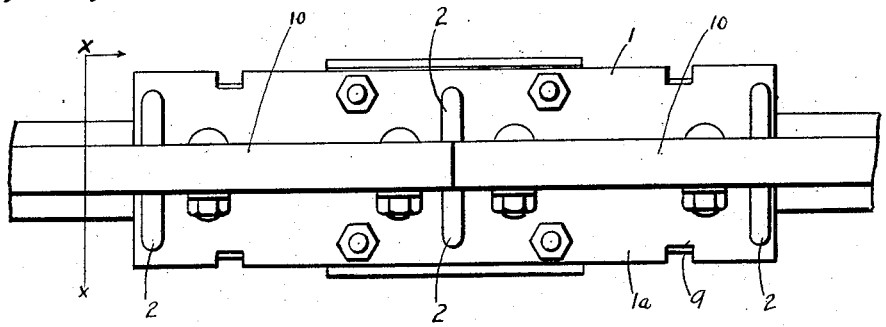

A. BUSA.
RAIL JOINT.
APPLICATION FILED APR. 5, 1911.

1,015,725.

Patented Jan. 23, 1912.

X-X

WITNESSES:
P. A. McCullough
K. H. G. Butler

INVENTOR.
A. BUSA
BY
N. C. Everitt Co.
ATTORNEYS.

UNITED STATES PATENT OFFICE.

ADAM BUSA, OF ANDERSON, TEXAS.

RAIL-JOINT.

1,015,725.   Specification of Letters Patent.   Patented Jan. 23, 1912.

Application filed April 5, 1911. Serial No. 619,045.

*To all whom it may concern:*

Be it known that I, ADAM BUSA, a subject of the Czar of Russia, residing at Anderson, in the county of Grimes and State of Texas, have invented certain new and useful Improvements in Rail-Joints, of which the following is a specification, reference being had therein to the accompanying drawing.

This invention relates to rail joints and has for its object to provide means in a manner as hereinafter set forth for connecting the opposing ends of a pair of rails, at the same time allowing for necessary contraction and expansion of the rails due to atmospheric conditions.

A further object of the invention is to provide a rail joint with means in a manner as hereinafter set forth and interposed between a pair of ties for reinforcing that portion of the joint at the meeting ends of the rails thereby reducing the sagging of the opposing ends of the rails to a minimum.

Further objects of the invention are to provide a rail joint which is comparatively simple in its construction and arrangement, strong, durable, efficient in its use, and with the elements constituting the joint comparatively inexpensive to manufacture.

With the foregoing and other objects in view, the invention consists in the novel construction, combination and arrangement of parts as hereinafter more specifically described and illustrated in the accompanying drawings wherein is shown an embodiment of the invention, but it is to be understood that changes, variations and modifications can be resorted to which come within the scope of the claim hereunto appended.

Figure 2:
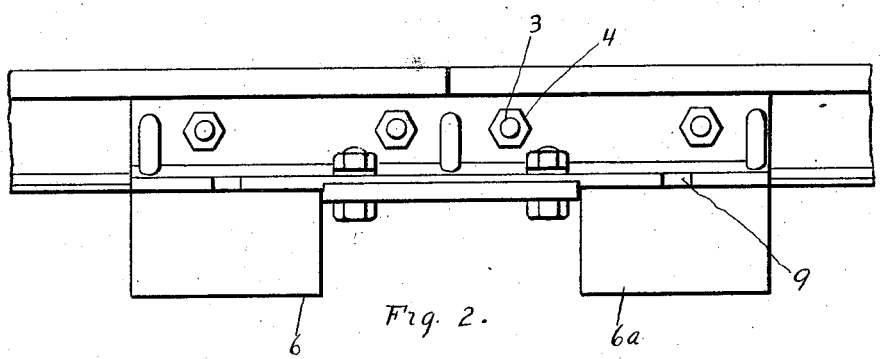
Figure 3:
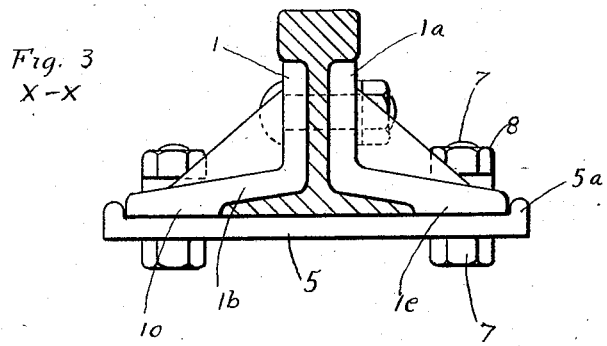

In describing the invention in detail, reference is had to the accompanying drawings wherein like reference characters denote corresponding parts throughout the several views and in which:

Figure 1 is a top plan view of a rail joint in accordance with this invention. Fig. 2 is a side elevation, and, Fig. 3 is a section on line X—X of Fig. 1, looking in the direction of the arrow.

Referring to the drawings in detail, 1 and $1^a$ denote a pair of fish plates or splice bars each provided with an angularly-disposed base $1^b$ extended as at $1^c$ with the lower face of the extended portion relatively wide and flat as at $1^e$. The fish plates 1 and $1^a$ abut against the webs of a pair of opposing rails 10 and also overlap the bases of said rails. The reference characters 6, $6^a$ denote a pair of ties upon which the rails 10 are mounted and further upon which the fish plates 1, $1^a$ extend. The fish plates 1, $1^a$ are formed with notches 9 through which are adapted to extend spikes (not shown) for securing the fish plates to the ties 6, $6^a$.

Each of the fish plates is formed with a series of reinforcing webs 2 which are disposed at right angles with respect to the webs of the rails and are integral with those portions of the fish plates which abut against the webs of the rails and are also integral with the angularly-disposed portions $1^b$ of the fish plates.

Interposed between the ties 6, $6^a$ and bearing against the bases of the rails 10 and also against the flattened lower faces $1^e$ of the extended portions $1^c$ is a transversely-extending reinforcing plate 5 provided at each end with a vertically-disposed flange $5^a$ against which abut the lower longitudinal edges of the fish plates 1, $1^a$. The reinforcing plate 5 is secured to the angularly-disposed portions $1^b$ of the fish plates 1 and $1^a$ through the medium of a series of vertically-disposed headed bolts 7 upon which are mounted clamping nuts 8, these latter engaging the upper faces of the angularly-disposed portions $1^b$. The heads of the bolts 7 abut against the lower face of the plate 5. The fish plates 1, $1^a$ are secured to the rails 10 through the medium of the bolts 3 and nuts 4.

What I claim is:

In a combination in a rail joint, a pair of ties, a pair of rails mounted upon said ties having the ends opposing each other, a pair of fish plates mounted against and secured to the sides of the rails and further secured to said ties, said fish plates having their lower portions extending beyond and overlapping the longitudinal edges of the base of said rails, the extending portions of said fish plates having a wide flat bottom face flush with the lower faces of the bases of the rails, said extended portions of the same length as the length of the fish plates, a transversely extending reinforcing plate positioned between the ties of a width substantially equal to the width of the space between the ties, said reinforcing plate positioned against the lower faces of the bases of the rails and the lower faces of said extended portions of the fish plate, said reinforcing plate at each end provided with a vertically extending flange abutting against the outer edge of an extended portion of a fish plate, and means projecting through the extended portions of said fish plates and said reinforcing plate in proximity to each end thereof for securing the fish plates and reinforcing plate together, reinforcing webs integral with the outer face of each of said fish plates and positioned one at each end and one at the center, and each of said fish plates provided with spike notches over the ties, said webs positioned inwardly of the longitudinal edges of the fish plates.

In testimony whereof I affix my signature in the presence of two witnesses.

ADAM BUSA.

Witnesses:
MIKE PHILLIPS,
K. P. JONES.

Copies of this patent may be obtained for five cents each, by addressing the "Commissioner of Patents, Washington, D. C."